United States Patent [19]

Grobbelaar

[11] Patent Number: 5,393,270
[45] Date of Patent: Feb. 28, 1995

[54] TRANSMITTING ROTARY POWER

[75] Inventor: Johannes R. Grobbelaar, Pretoria, South Africa

[73] Assignee: Reunert Mechanical Systems Limited, Alberton, South Africa

[21] Appl. No.: 38,004

[22] Filed: Mar. 29, 1993

[30] Foreign Application Priority Data

Mar. 30, 1992 [ZA] South Africa ............. 92/2306

[51] Int. Cl.⁶ .............................................. F16D 3/10
[52] U.S. Cl. ............................................ 474/5; 474/75
[58] Field of Search ............................ 474/1–7, 474/75, 84, 88

[56] References Cited

U.S. PATENT DOCUMENTS

| | | | |
|---|---|---|---|
| 3,721,132 | 3/1973 | Johnson | 474/2 |
| 3,722,277 | 3/1973 | Fell et al. | 474/5 |
| 3,728,905 | 4/1973 | Fell et al. | 474/5 |
| 3,731,557 | 5/1973 | Kamlukin et al. | 474/5 X |
| 3,938,400 | 2/1976 | Konyha | 474/5 |
| 4,132,121 | 1/1979 | Clarke | |
| 4,237,983 | 12/1980 | Allen | 474/1 X |
| 4,340,377 | 7/1982 | Johnson et al. | 474/81 |
| 4,344,500 | 8/1982 | Kurata et al. | 474/146 X |
| 4,494,623 | 1/1985 | Kurata et al. | 474/146 X |
| 4,498,553 | 2/1985 | Kurata et al. | 474/146 X |
| 4,696,661 | 9/1987 | Rehlander | 474/5 |
| 4,768,997 | 9/1988 | Page et al. | 474/84 |
| 4,771,856 | 9/1988 | Hutchison et al. | 474/1 X |
| 5,054,367 | 10/1991 | Heldmann et al. | 89/46 |

FOREIGN PATENT DOCUMENTS

| | | |
|---|---|---|
| 1020039 | 11/1952 | France . |
| 2667123 | 3/1992 | France . |
| 3133922 | 3/1983 | Germany . |
| 575022 | 6/1944 | United Kingdom . |

OTHER PUBLICATIONS

Fenner Sales Catalog, pp. 304, 36–37 and 12 (undated).

*Primary Examiner*—Roger J. Schoeppel
*Attorney, Agent, or Firm*—Thomas R. Vigil

[57] ABSTRACT

A motor 12 has an output shaft 18. A transmission device 14 transmits rotary power, selectively, in any one of two drive modes from the shaft 18 to an output shaft 16 connected to a rotary load. The drive modes differ in respect of direction of rotation and/or speed ratio. Output pulleys 20/22 are respectively connected to intermediate pulleys 44/54 on the device 14. Auxiliary intermediate wheels 48/58, which are respectively co-axial with and connected to the pulleys 44/54, are drivingly connected respectively in accordance with the two drive modes by means of a drive element 51 to an output wheel 42 on the shaft 16. The device 14 is pivoted about the shaft 16 as shown at 36. Pivoting in one direction tightens a V-belt 50 transmitting drive to the pulley 44 and thence via the wheel 48 in a first drive mode to the shaft 16; while slackening a V-belt 60 to disconnect drive to the pulley 54. Pivoting in an opposite direction causes drive via the pulley 54 and wheel 58 to the shaft 16 in the other drive mode.

24 Claims, 4 Drawing Sheets

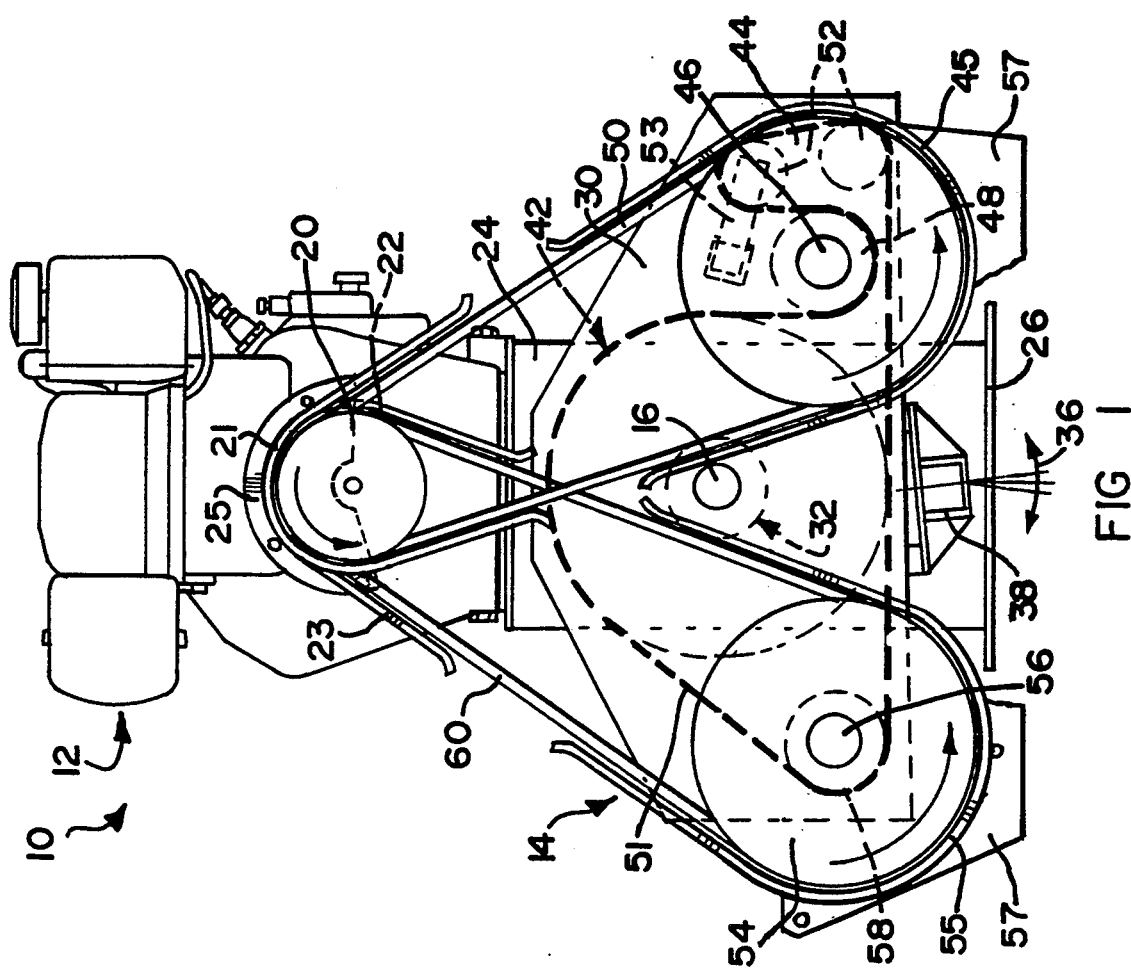
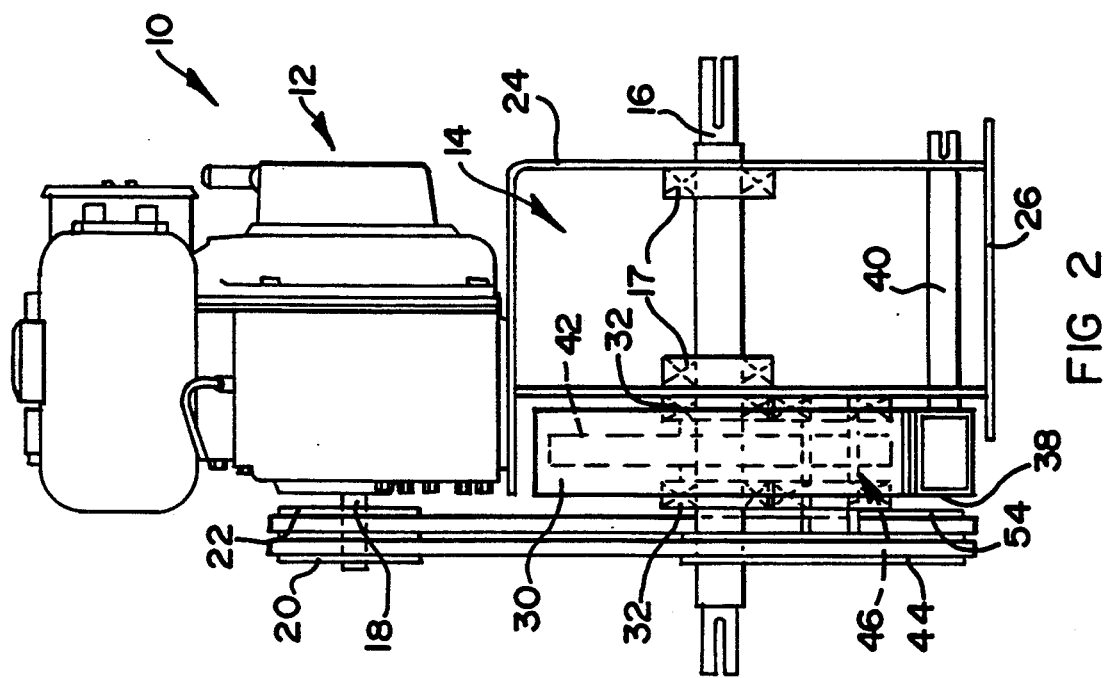

TRANSMITTING ROTARY POWER

FIELD OF THE INVENTION

THIS INVENTION relates to transmitting rotary power. It relates more specifically to a method of transmitting rotary power, to a rotary power transmission device and to an installation in which rotary power is transmitted from a source of rotary power to a rotary load.

The Applicant is of opinion that this invention will find particular application in the field of power transmission in low speed, low power, motorized vehicles and also stationary applications. The invention is, however, not limited to those fields.

SUMMARY OF THE INVENTION

In accordance with a first aspect of the invention, there is provided a method of transmitting rotary power, from a source of rotary power to a rotary load, selectively in at least two drive modes, the method including providing a transmission device which includes
    first and second intermediate wheels which are independently rotatable,
    source connection means adapted operatively to connect respectively the first and the second intermediate wheels to the source of rotary power,
    load connection means adapted operatively to connect the rotary load respectively to the first and to the second intermediate wheels;
  mounting the transmission device relative to the source of rotary power and the rotary load to be selectively movable between a first operative condition and a second operative condition;
  connecting respectively the source of rotary power by means of the source connection means and the rotary load by means of the load connection means to the transmission device such that:
    when the transmission device is in its first operative condition, driving connection in a first drive mode of said at least two drive modes is effected from the source of rotary power via the first intermediate wheel to the rotary load and drive from the source of rotary power to the rotary load via the second intermediate wheel is disconnected, and
    when the transmission drive is in its second operative condition, driving connection in a second drive mode of said at least two drive modes is effected from the source of rotary power via the second intermediate wheel to the rotary load and drive from the source of rotary power to the rotary load via the first intermediate wheel is disconnected,
    the first drive mode and the second drive mode differing in respect of at least one of direction of rotation and speed ratio; and
  appropriately moving the transmission device into a selected one of the first and second operative conditions.

The method may include interrupting transmission of power from the source of rotary power to the rotary load in a neutral mode by moving the transmission device into a neutral condition.

Moving the transmission device may preferably be by pivoting, the transmission device being pivotally mounted. The first and second operative conditions will then correspond to different angular orientations of the transmission device. Then, the neutral condition may be intermediate the first and second operative conditions.

In one class of methods, connecting of the rotary load by means of the load connection means to the transmission device may be fixed, connecting of the source of rotary power by means of the source connection means to the transmission device then being adapted appropriately to effect driving connection and to disconnect drive in response to the condition of the transmission device. Connecting the rotary load to the transmission device may then include connecting the rotary load in accordance with the first drive mode to the first intermediate wheel, and connecting the rotary load in accordance with the second drive mode to the second intermediate wheel. The method may further include transmitting the rotary power frictionally via the source connection means by means of flexible, endless drive members.

Said one class of methods may further include transmitting the rotary power from the respective intermediate wheels to the rotary load by means of auxiliary first and second intermediate wheels fixed to the first and second intermediate wheels and via an output wheel drivingly connected to the auxiliary first and second wheels and to the rotary load.

The invention extends to a rotary power transmission device, suitable for transmitting rotary power, from a source of rotary power to a rotary load, selectively in at least two drive modes, the transmission device including first and second intermediate wheels which are independently rotatable,
  source connection means adapted operatively to connect respectively the first and the second intermediate wheels to the source of rotary power,
  load connection means adapted operatively to connect the rotary load respectively to the first and to the second intermediate wheels;
  mounting means for mounting the transmission device for movement to be movable between a first operative condition and a second operative condition;
  the arrangement of one of the source connection means and the load connection means being such that:
    when the transmission device is in its first operative condition, driving connection in a first drive mode of said at least two drive modes is effected from the source of rotary power via the first intermediate wheel to the rotary load and drive from the source of rotary power to the rotary load via the second intermediate wheel is disconnected, and
    when the transmission drive is in its second operative condition, driving connection in a second drive mode of said at least two drive modes is effected from the source of rotary power via the second intermediate wheel to the rotary load and drive from the source of rotary power to the rotary load via the first intermediate wheel is disconnected,
    the first drive mode and the second drive mode differing in respect of at least one of direction of rotation and speed ratio.

The mounting means may allow moving of the transmission device into a neutral condition in which transmission of power is interrupted. The neutral position may be intermediate the first and second operative conditions.

In a preferred embodiment, the mounting means may be pivotal mounting means such that the transmission device is pivotal between its first and second operative conditions.

In one class of embodiments, the mounting means may be adapted to mount the transmission device for movement relative to the source of rotary power, the load connection means being adapted fixedly to connect the rotary load to the first and second intermediate wheels, and the source connection means being adapted appropriately to effect driving connection and to disconnect drive in response to the condition of the transmission device.

Advantageously, the pivotal mounting of the transmission device may be about an axis co-axial with an axis of an output shaft driving into the rotary load in use. The line or distance from said axis of the output shaft to any point on the transmission device—specifically to the first and second intermediate wheels—then remains constant regardless of the angular orientation of the device.

The first and second intermediate wheels may be in the form of pulleys, driving connection between the source of rotary power and the respective intermediate wheels being frictional by means of belts.

In said one class of embodiments, the load connection means may include an auxiliary first intermediate and an auxiliary second intermediate wheel which are respectively drivingly connected to the first and second intermediate wheels, an output wheel, and output connection means drivingly connecting the output wheel to the auxiliary first and auxiliary second intermediate wheels. The first intermediate wheel and first auxiliary intermediate wheel may fixedly drivingly be connected about a common axis and the second intermediate wheel and second auxiliary intermediate wheel may fixedly drivingly be connected about a common axis.

In one embodiment, the auxiliary intermediate wheels and the output wheel may be in the form of pulleys, the output connection means being in the form of complemental V-belts.

In another embodiment, the auxiliary intermediate wheels and the output wheel may be in the form of sprockets, the output connection means being in the form of complemental chains.

In yet another embodiment, the auxiliary intermediate wheels and the output wheel may be in the form of cogged wheels, the output connection means being provided by an arrangement causing the cogged wheels to mesh. If desired, a suitable combination of, say, chain drive and cogged wheel or gear drive may be used instead.

By way of development, when the auxiliary intermediate wheels and output wheel are in the form of pulleys and the output connection means is in the form of complemental V-belts, the auxiliary intermediate wheels may be in the form of adjustable pulleys to allow the relative diameters of the pulleys to be adjusted to effect speed adjustment. Instead, the auxiliary intermediate wheels may be in the form of stepped pulleys to allow different speed ratios to be selected. However, preferably, the intermediate wheels, rather than the auxiliary intermediate wheels may be in the form of adjustable pulleys or stepped pulleys. Then, it may be possible to accommodate the length discrepancy in the belt length by appropriately changing the working angle or attitude of the pivoting mechanism.

The invention extends yet further to an installation including a source of rotary power, a rotary load and a transmission device as herein described, the components being operatively connected to transmit rotary power from the source of rotary power to the rotary load. The installation may be in the form of a motorized vehicle, a drive wheel of the vehicle forming the rotary load.

The invention is now described by way of example with reference to the accompanying diagrammatic drawings.

BRIEF DESCRIPTION OF THE DRAWINGS

FIGS. 1, 2 and 3 show respectively in frontal view side view and plan view a motor and transmission unit in accordance with the invention;

DESCRIPTION OF THE PREFERRED EMBODIMENTS

Figure 3:
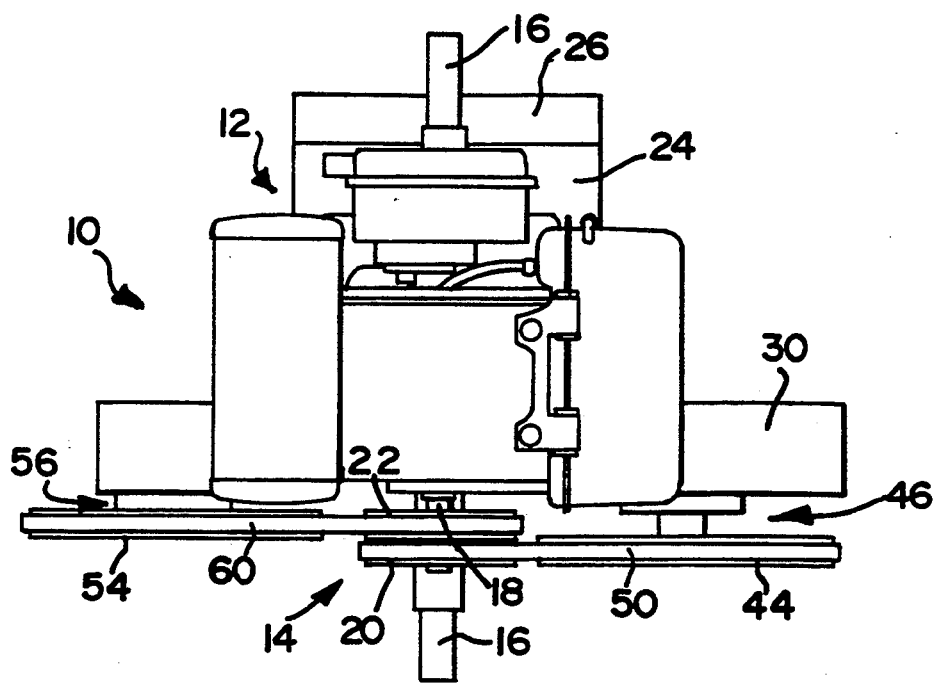

With reference to FIGS. 1 to 3, a motor/transmission unit in accordance with the invention is generally indicated by reference numeral 10. It comprises an internal combustion engine generally indicated by reference numeral 12, a transmission device in accordance with the invention and indicated by reference numeral 14 and an output shaft 16 representing a rotary load. In practice, a rotary load will drivingly be connected to the output shaft 16.

The transmission device 14 is arranged to transmit rotary power selectively in two modes to the output shaft 16.

The internal combustion engine 12 has an output shaft 18 on which are mounted two drive pulleys respectively indicated by reference numerals 20 and 22.

The internal combustion engine 12 is supported at an elevated position on a pedestal 24 which is mounted on a bed plate 26. The pedestal 24 is in the form of appropriately bent plating.

The output shaft 16 is mounted for rotation in bearings 17 in the pedestal 24. The output shaft 16 is parallel to, and in this case vertically underneath, the output shaft 18 of the internal combustion engine 12. The output shaft 16 extends rearwardly beyond the pedestal 24 to allow a rotary load to be connected thereto from the rear. It also extends forwardly well beyond the front of the pedestal 24 to mount the transmission device 14 as will be described hereinafter and also to provide a fore extension to which a rotary load can be connected.

The transmission device 14 comprises a hollow pivotal casing 30 which is mounted by means of bearings 32, such as to allow pivoting, on the output shaft 16 immediately in front of the pedestal 24. At a lower end thereof a pivot member 38 fast with the pivotal casing 30 mounts a pivot shaft 40 by means of which the pivotal casing 30 can be pivoted pendulum fashion generally as indicated by reference numeral 36 in FIG. 1.

Internally in the pivotal casing 30, there is mounted an output wheel 42 such as to be drivingly connected to the output 16. It is of significance that the pivotal casing 30 is pivotal about the axis of the output wheel 42.

A first intermediate wheel 44 is mounted for rotation on the pivotal casing 30 to be aligned with the first drive pulley 20. The first intermediate wheel 44 is mounted via a stub shaft in bearings mounted on the pivotal casing generally as indicated by reference numeral 46. The stub shaft has an axis which is parallel to the output shaft 16 and transversely spaced therefrom toward one side of the transmission device 14. Internal of the pivotal casing 30, and mounted on the stub shaft and thus drivingly fast with the first intermediate wheel 44, there is provided a first auxiliary intermediate wheel 48.

Similarly, and in this case symmetrically, there is provided a second intermediate wheel 54 toward an opposed side of the pivotal casing 30. Also the second intermediate wheel 54 is mounted by way of a stub shaft and bearings generally as indicated by reference numeral 56 to the pivotal casing 30. A second auxiliary intermediate wheel 58 is provided fast with the stub shaft internal of the pivotal casing 30 and in line with the output wheel 42.

The first intermediate wheel 44 is aligned with the first drive pulley 20 and is drivingly connected by means of a V-belt 50 with the first drive pulley 20. Thus, in this embodiment, the first intermediate wheel 44 is also in the form of a pulley.

Similarly, the second intermediate wheel 54 is aligned with the second drive pulley 22 and is connected thereby by means of a V-belt 60. Thus, also the second intermediate wheel 54 is in the form of a pulley.

The first and second auxiliary intermediate wheels 48 and 58 are aligned with each other and with the output wheel 42.

As can be seen in FIG. 1, a drive element 51 drivingly connects both of the auxiliary intermediate wheels 48 and 58 to the output wheel 42. Driving interconnection is such that, when the first intermediate wheel 44 rotates counter-clockwise as seen in FIG. 1, the output wheel 42 will rotate clockwise. In contrast, if the second intermediate wheel 54 is rotated counter-clockwise, the output wheel 42 will also be rotated counter-clockwise. (In other embodiments, separate output wheels, which may or may not be mounted on a common shaft, may be provided. Separate driving connections to the auxiliary intermediate wheels will then be provided.)

It is to be appreciated that the interconnection between the auxiliary intermediate wheels and the output wheel is fixed. This is made possible by having the pivotal casing 30 which mounts the intermediate wheels and auxiliary intermediate wheels pivotal about the output shaft 16 i.e. about the axis of the output wheel 42.

In use, the pivotal casing 30 is pivoted in a desired direction 36 such that a desired one of the V-belts 50 and 60 is drivingly connected via its drive pulley 20 or 22 to the output shaft 18 of the internal combustion engine 12. At the same time, the other of the intermediate wheels is drivingly disconnected from its output pulley as its V-belt is slack. In an intermediate orientation, neither of the V-belts 50, 60 is connected, and no drive is transmitted, as both V-belts are slack.

Advantageously, guides 45/55 (FIG. 1) are provided spaced around lower portions of the first and second intermediate wheels 44, 54 to cover the V-belts 50, 60 and furthermore, when any of the V-belts 50, 60 is slackened, to lift such V-belt with lost motion such that it unseats from its drive pulley 20, 22. Thus, the V-belt which is not tensioned and which is thus not operative, is lifted off its pulleys or at least partially off its pulleys such that it is not connected. Similarly, guides 21/23 (FIG. 1) are provided around the upper portions of the drive pulleys 20, 22 to receive the respective V-belts with lost motion when lifted from the pulleys 20, 22. The guides 21/23 are mounted on a side plate 25 behind the pulleys 20/22. Similarly, the guides 45/55 are mounted on a side plate 57 behind the pulleys 44/54. The guides and side plates are shown in FIG. 1 only. For clarity of drawing, they have been omitted from the other figures.

Drive is then transmitted from the internal combustion engine 12 via the tensioned V-belt 50/60 to the appropriate intermediate wheel 44/54 and thence from the corresponding auxiliary intermediate wheel 48/58 via the drive element 51 to the output wheel 40 and the output shaft 16.

When the pivotal casing 30 is pivoted in the opposite direction, drive would take place via the other of the intermediate wheels which would reverse the direction of rotation of the output shaft 16. Thus, in the embodiment of FIGS. 1 to 3, the two modes at which drive can selectively be transmitted by the transmission device 14 are opposite in direction. Because the first and second drive pulleys 20, 22 are of equal effective diameter, the first and second intermediate wheels 44, 54 are of equal effective diameter and the first and second auxiliary intermediate wheels 48, 58 are of equal effective diameter, the speed ratios of the first and second modes are equal, but opposite in direction.

With reference to FIGS. 4 to 7 the general construction and operation of the various transmission devices respectively indicated by reference 114, 214, 314 and 414 are similar and like reference numerals refer to like parts. The transmission devices are not again described in detail but emphasis is merely placed on differences.

The transmission device 114 makes use of a chain drive between its auxiliary intermediate wheels 148, 158 and the output wheel 142. Thus, the first and second auxiliary intermediate wheels 148, 158 and output wheel 142 are in the form of cogged wheels. Correspondingly, the drive element 151 is in the form of a chain. Furthermore, the arrangement of the chain 151 is such that the direction of drive remains the same regardless of whether drive takes place via the first intermediate wheel 54 or the second intermediate wheel 44. However, the second auxiliary intermediate wheel 158 is smaller than the corresponding first auxiliary intermediate wheel 148. Thus, the two modes at which drive can be transmitted differ in respect of speed ratio.

Figure 5:
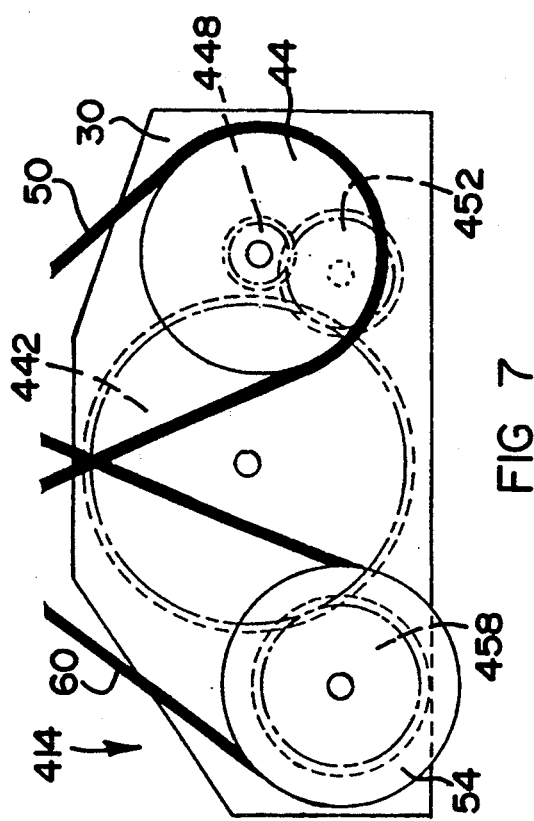
FIGS. 4 to 7 show, respectively in front views, variations in the arrangement or construction of the transmission device of FIGS. 1 to 3.
Figure 4:
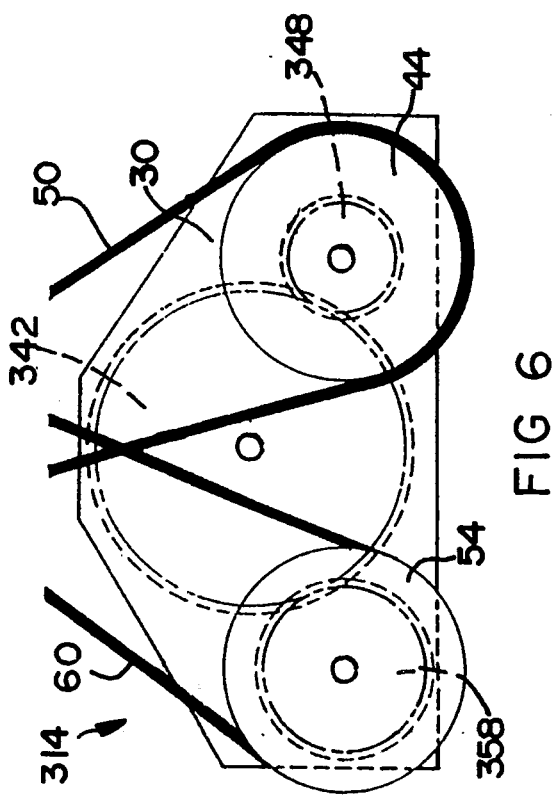

With reference to FIG. 5, the transmission device 214 is similar to the transmission device 114 in that a chain drive is used. However, it is similar to the device of FIG. 1 in that drive is transmitted at equal speed ratios but in opposite directions of rotation.

Figure 7:
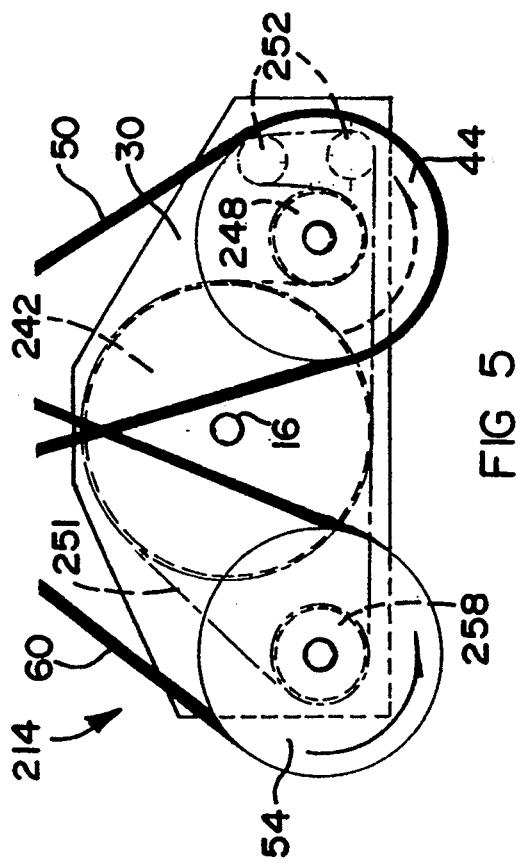
Figure 6:
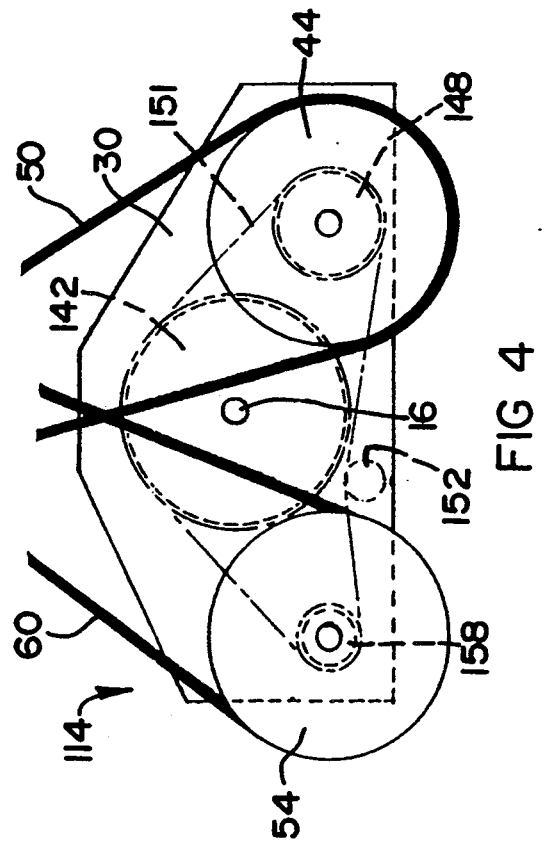

In FIGS. 6 and 7, the auxiliary intermediate wheels and the output wheel, in each case, are in the form of gears which are drivingly interconnected by meshing with one another.

In the FIG. 6 embodiment, the direction of rotation is the same regardless of whether drive takes place via the first intermediate wheel 44 or the second intermediate wheel 54. However, the second auxiliary intermediate wheel 358 is larger than the first auxiliary intermediate wheel 348 and the speed ratio at which power is transmitted via the second intermediate wheel 54 is higher than via the first intermediate wheel 44.

In the FIG. 7 embodiment, meshing between the first auxiliary intermediate wheel 448 and the output wheel 442 is via an idler gear 452 and thus the direction of transmission is reversed depending on whether it takes place via the first intermediate wheel 44 or the second intermediate wheel 54. Also, the diameter ratio of the first auxiliary intermediate wheel 448 and the second auxiliary intermediate wheel 458 is about 1:2 or 1:3 and there is thus a substantial difference in the speed ratios.

Apart from the specific arrangement of the driving connection between the auxiliary intermediate wheels and the output wheel, three types of transmissions have been described namely via a V-belt, via a chain and via gears. An appropriate arrangement of driving connection and an appropriate type of driving connection will be selected bearing in mind the intended use of the transmission.

Figure 8:
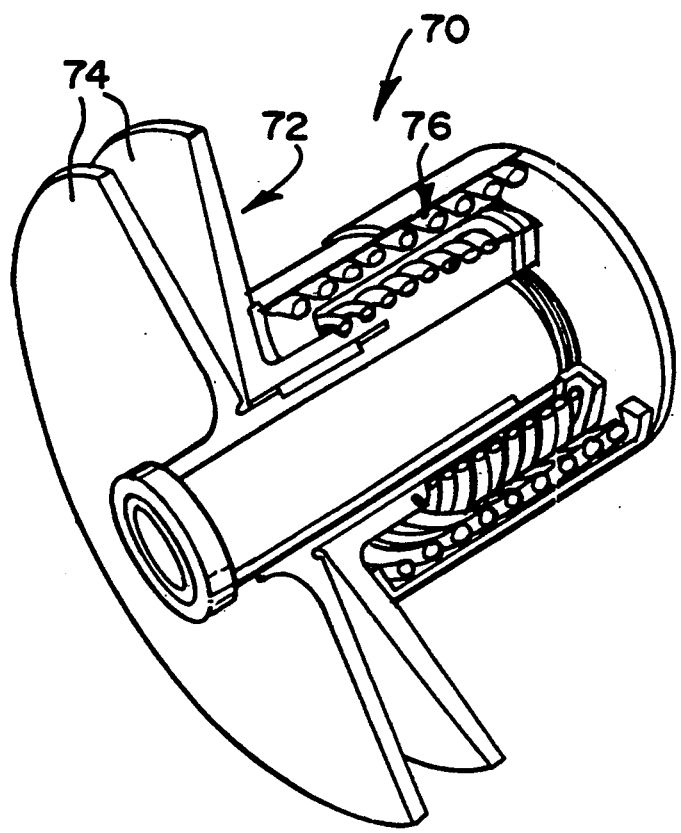
FIG. 8 shows, in three dimensional view, to a larger scale, an adjustable pulley suitable for use with the motor/transmission unit of FIGS. 1 to 3.

With reference to FIG. 8, by way of development, an adjustable pulley assembly, used preferably in pairs, may be utilized. Such a pulley assembly is generally indicated by reference numeral 70 in FIG. 8. The assembly 70 comprises an adjustable pulley 72 having flanges 74 the spacing of which is varied to adjust the effective diameter at which a V-belt engages the pulley and thus effectively varying the speed of transmission. It has adjustment means generally indicated by reference numeral 76 by means of which the spacing of the flanges 74 can be adjusted. The adjustable pulley 70 can be any suitable standardly available pulley assembly or can be specifically made for a specific application. If adjustable pulleys are used on the intermediate wheels, it may be feasible, instead of using them in pairs to keep the V-belt length constant, to use them singly and to accommodate the effective discrepancy in V-belt length by means of changing the working angle or attitude of the pivoting mechanism.

The Applicant regards it as an advantage that the invention provides a simple and inexpensive but nevertheless effective way of transmitting rotary power selectively in two modes. The two modes can differ in at least one of direction of rotation or speed ratio. In addition, advantageously, a neutral mode is also provided. The motor is thus allowed to idle.

If desired, an independently operable drive mode may be provided for use when the transmission device is in neutral mode. Thus, for example, when the transmission device is adapted selectively to provide drive in the same direction and at different speeds respectively, the independently operable drive mode may be adapted to provide drive in reverse direction. The independently operable drive mode may use, e.g. a separate pulley on the output shaft 18 of the motor or engine 12, a separate pulley on the output shaft 16, an endless flexible drive element over said separate pulleys, and an independently operable tensioner selectively to effect and interrupt engagement.

It is also important that drive from the source of rotary power to the intermediate wheels takes place frictionally. Thus, changes in speed and torque are smoothed or evened out by slippage. Therefore, use of the transmission device obviates a separate friction clutch. The Applicant is of opinion that the invention can particularly advantageously be applied to low speed low power motorized vehicles or stationary applications.

Figure 9:
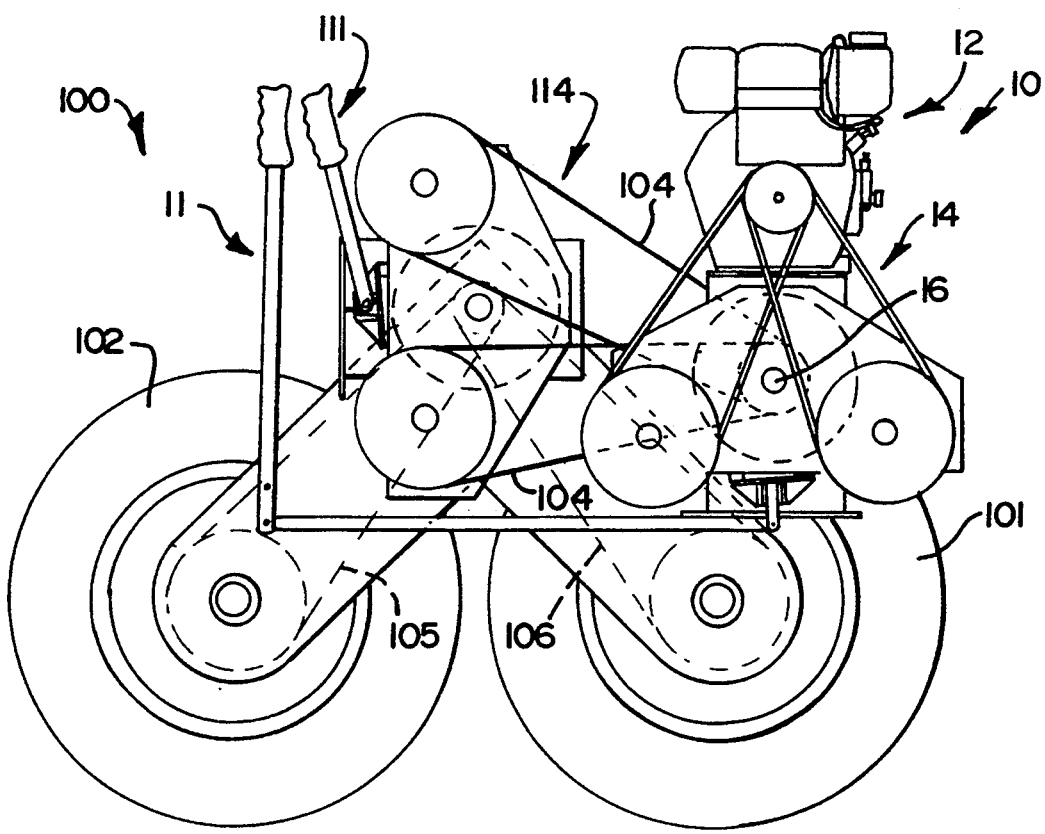
FIGS. 9 and 10 show, respectively in sectional side view and plan view, a motorized vehicle in accordance with the invention.
Figure 10:
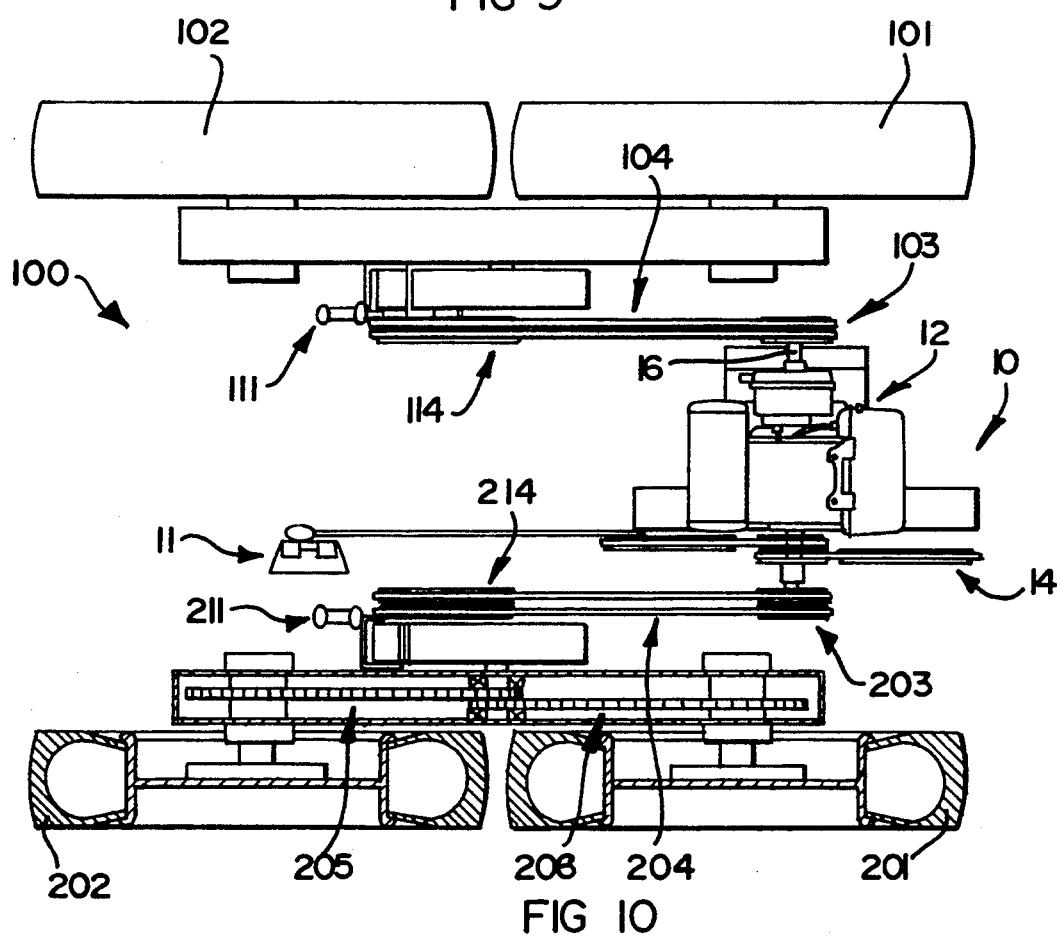

Thus, accordingly, and with reference to FIGS. 9 and 10, a low power low speed motorized vehicle in accordance with the invention is generally indicated by reference numeral 100. The vehicle 100 has fixed axles mounting, respectively, left fore and rear wheels 101 and 102 and right fore and rear wheels 201 and 202. It is powered by means of the motor/transmission unit 10 as described above and comprising the internal combustion engine 12 and the transmission device generally indicted by reference numeral 14. The unit 10 is similar to the unit described with reference to FIGS. 1 to 7 and the same reference numerals denote the same components.

In this embodiment, the transmission device 14 is adapted to transmit power in the same direction but respectively in low and high ratio in the respective drive modes. It is also capable of interrupting transmission of power in its neutral mode.

The unit 10 has a common output shaft 16. At one end of the output shaft, as indicated by reference numeral 103, it has two pulleys which are drivingly connected by means of endless flexible drive members 104 to a transmission device in accordance with the invention and generally indicated by reference numeral 111. The transmission device 111 is arranged to drive the left fore and rear wheels 101 and 102 in accordance with the invention.

Similarly, at the other end of the output shaft 16, it has a pair of pulleys 203 which are drivingly connected by means of flexible drive elements 204 to a further transmission device in accordance with the invention generally indicated by reference numeral 211. The device 211 is arranged to drive the right fore and rear wheels 201 and 202.

Drive of respectively the left and the right wheels takes place in mirror image fashion and only the right hand drive arrangement will be described.

The transmission device 214 is arranged in upright orientation (as can best be perceived for the transmission device 114 shown in FIG. 9). The transmission device 214 is adapted to transmit drive, at the same speed, but respectively in forward and reverse, in its two drive modes. It is also capable of an intermediate neutral mode in which drive is not transmitted.

From output wheels, mounted on a common output shaft, of the device 214, drive is transmitted by means of endless flexible chains respectively indicated by reference numerals 205 and 206 to the rear right wheel 202 and the front right wheel 201.

Control means generally indicated by reference numeral 11 is provided to control operation of the transmission device 14. Similarly, separate control means 111 and 211 are provided to control respectively the control device 114 and the control device 214.

In this embodiment, by means of the control means 11, rotary power from the internal combustion engine 12 can be transmitted to the respective transmission devices 114 and 214 in a selected one direction either at a high speed ratio or a low speed ratio. It is also capable of being in neutral mode in which drive is not transmitted and the internal combustion engine 12 is allowed merely to idle. It is to be appreciated, as explained above, that a separate friction clutch is not provided.

Each of the transmission devices 114 and 214 can, selectively, transmit drive to the wheels either in forward or reverse direction. If desired, both the transmission devices can independently be adjusted into neutral mode in which power is not transmitted.

Thus, in use, an operator can propel the vehicle 100 at high speed, at low speed, or can select idling mode. Furthermore, by means of the transmission devices 114 and 214, the operator can propel the vehicle 100 forward or rearward. In addition, because the transmission devices 114 and 214 can be controlled independently, one side of the vehicle can be propelled forward while the other side is propelled rearward or is held stationary in idle mode and by utilizing brakes if desired. In that fashion, pivot steering can be achieved.

It should be readily apparent to a reader skilled in the art that other arrangements of the respective transmission devices can be used to obtain different, desired drive conditions.

In addition to the advantages mentioned for the transmission device, it has now been exemplified that transmission devices in accordance with the invention can be used to transmit drive to a vehicle in a manner in which the vehicle is controllable in a number of ways. It is important to appreciate that the transmission devices are provided relatively inexpensively, and that no separate friction clutch is required.

I claim:

1. A method of transmitting rotary power, from a source of rotary power to a rotary load, selectively in at least two drive modes, the method including
   providing a transmission device which includes
      a body,
      first and second intermediate wheels which are mounted for independent rotation respectively about first and second intermediate axes which are in fixed relation to said body,
      source connection means adapted drivingly to connect respectively the first and the second intermediate wheels to the source of rotary power,
      load connection means adapted drivingly to connect the rotary load respectively to the first and to the second intermediate wheels;
   mounting the transmission device relative to the source of rotary power and the rotary load such that said body including the first and second intermediate wheels is selectively movable between a first operative condition and a second operative condition;
   connecting respectively the source of rotary power by means of the source connection means and the rotary load by means of the load connection means to the transmission device such that:
      when the body of the transmission device is in said first operative condition, driving connection in a first drive mode of said at least two drive modes is effected from the source of rotary power via the first intermediate wheel to the rotary load and driving connection from the source of rotary power to the rotary load via the second intermediate wheel is disconnected, and
      when the transmission device is in said second operative condition, driving connection in a second drive mode of said at least two drive modes is effected from the source of rotary power via the second intermediate wheel to the rotary load and driving connection from the source of rotary power to the rotary load via the first intermediate wheel is disconnected,
      the first drive mode and the second drive mode differing in respect of at least one of direction of rotation and speed ratio; and
      appropriately moving said body of the transmission device into a selected one of the first and second operative conditions of the transmission device.

2. A method as claimed in claim 1 which includes interrupting transmission of power from the source of rotary power to the rotary load in a neutral mode by moving the body including the first and second intermediate wheels into a neutral condition.

3. A method as claimed in claim 2 in which the body is pivotally mounted, in which the first and second operative conditions correspond to different angular orientations of the body including the first and second intermediate rotation axes and in which moving the body is effected by pivoting it.

4. A method as claimed in claim 3, in which the neutral condition is intermediate the first and second operative conditions.

5. A method as claimed in claim 1 in which connecting of the rotary load by means of the load connection means to the transmission device is fixed, and in which connection of the source of rotary power by means of the source connection means to the transmission device is such that:
   when the body of the transmission device is in said first operative condition, driving connection in said first drive mode is effected from the source of rotary power to the first intermediate wheel and driving connection from the source of rotary power to the second intermediate wheel is disconnected, and
   when the body of the transmission device is in said second operative condition, driving connection in said second drive mode is effected from the source of rotary power to the second intermediate Wheel, and driving connection from the source of rotary power to the first intermediate wheel is disconnected.

6. A method as claimed in claim 5 in which connecting the rotary load to the transmission device includes connecting the rotary load in accordance with the first drive mode to the first intermediate wheel, and connecting the rotary load in accordance with the second drive mode to the second intermediate wheel.

7. A method as claimed in claim 5 which includes transmitting the rotary power frictionally via the source connection means by means of flexible, endless drive members.

8. A method as claimed in claim 5 which includes transmitting the rotary power from the first and second intermediate wheels to the rotary load by means of auxiliary first and second intermediate wheels fixed to the first and second intermediate wheels and via an output wheel drivingly connected to the auxiliary first and second wheels and to the rotary lead.

9. A rotary power transmission device, suitable for transmitting rotary power, from a source of rotary power to a rotary load, selectively in at least two drive modes, the transmission device including
   a body,
   first and second intermediate wheels which are mounted for independent rotation respectively about first and second intermediate axes which are in fixed relation to said body,
   source connection means adapted drivingly to connect respectively the first and the second intermediate wheels to the source of rotary power, load connection means adapted drivingly to connect the rotary load respectively to the first and to the second intermediate wheels;

mounting means for mounting the transmission device for movement such that said body including the first and second intermediate wheels is movable between a first operative condition and a second operative condition;

the arrangement of either the source connection means or the load connection means being such that:

when the transmission device is in said first operative condition, driving connection in a first drive mode of said at least two drive modes is effected from the source of rotary power via the first intermediate wheel to the rotary load and driving connection from the source of rotary power to the rotary load via the second intermediate wheel is disconnected, and when the transmission device is in said second operative condition, driving connection in a second drive mode of said at least two drive modes is effected from the source of rotary power via the second intermediate wheel to the rotary load and driving connection from the source of rotary power to the rotary load via the first intermediate wheel is disconnected, the first drive mode and the second drive mode differing in respect of at least one of direction of rotation and speed ratio.

10. A rotary power transmission device as claimed in claim 9 in which the mounting means allow moving of the body including the first and second intermediate wheels into a neutral condition in which transmission of power is interrupted.

11. A rotary power transmission device as claimed in claim 10, in which the neutral condition is intermediate the first and second operative conditions.

12. A rotary power transmission device as claimed in claim 9 in which the mounting means is pivotal mounting means such that the transmission body is pivotal between said first and second operative conditions.

13. A rotary power transmission device as claimed in claim 12 in which the mounting means is adapted to mount the body for movement relative to the source of rotary power, in which the load connection means is adapted fixedly to connect the rotary load to the first and second intermediate wheels, and in which the source connection means is adapted appropriately to effect driving connection and to disconnect driving connection in response to the operative of the transmission device.

14. A rotary power transmission device as claimed in claim 13 in which the pivotal mounting of the body is about an axis co-axial with an axis of an output shaft driving into the rotary load in use.

15. A rotary power transmission device as claimed in claim 13 in which the first and second intermediate wheels are in the form of pulleys, and in which driving connection between the source of rotary power and the first and second intermediate wheels is frictional by means of belts.

16. A rotary power transmission device as claimed in claim 15 in which the first and second intermediate wheels are in the form of adjustable pulleys having diameters which are adjustable to allow said diameters to be adjusted to effect speed adjustment.

17. A rotary power transmission device as claimed in claim 15 in which the first and second intermediate wheels are in the form of stepped pulleys to allow different speed ratios to be selected.

18. A rotary power transmission device as claimed in claim 13 in which the load connection means includes an auxiliary first intermediate and an auxiliary second intermediate wheel which are respectively drivingly connected to the first and second intermediate wheels, an output wheel, and output connection means drivingly connecting the output wheel to the auxiliary first and auxiliary second intermediate wheels.

19. A rotary power transmission device as claimed in claim 18 in which the first intermediate wheel and first auxiliary intermediate wheel are fixedly drivingly connected about said first intermediate axis and in which the second intermediate wheel and second auxiliary intermediate wheel are fixedly drivingly connected about said second intermediate axis.

20. A rotary power transmission device as claimed in claim 18 in which the auxiliary intermediate wheels and the output wheel are in the form of pulleys and the output connection means is in the form of a complemental V-belt.

21. A rotary power transmission device as claimed in claim 18 in which the auxiliary intermediate wheels and the output wheel are in the form of sprockets, and the output connection means is in the form of a complemental chain.

22. A rotary power transmission device as claimed in claim 18 in which the auxiliary intermediate wheels and the output wheel are in the form of cogged wheels, and the output connection means is provided by an arrangement causing the cogged wheels to mesh.

23. An installation including a source of rotary power, a rotary load and a transmission device as claimed in claim 9 operatively connected to transmit rotary power from the source of rotary power to the rotary load.

24. An installation as claimed in claim 23 which is in the form of a motorized vehicle, a drive wheel of the vehicle forming the rotary load.

* * * * *

UNITED STATES PATENT AND TRADEMARK OFFICE
CERTIFICATE OF CORRECTION

PATENT NO. : 5,393,270
DATED : February 28, 1995
INVENTOR(S) : Johannes R. Grobbelaar It is certified that error appears in the above-indentified patent and that said Letters Patent is hereby corrected as shown below:

Column 4, line 16, insert a comma after "view".

Column 6, line 18, "wheel 40" should be --wheel 42--.

Column 8, line 10, "indicted" should be --indicated--.

Column 10, line 35, "Wheel" should be --wheel--.

Column 10, line 56, "lead" should be --load--.

Column 11, line 53, "operative" should be --operation--.

Signed and Sealed this

Sixteenth Day of May, 1995

Attest:

BRUCE LEHMAN

Attesting Officer    Commissioner of Patents and Trademarks